US010320808B2

(12) United States Patent
Randall et al.

(10) Patent No.: US 10,320,808 B2
(45) Date of Patent: Jun. 11, 2019

(54) CLICKJACKING PREVENTION

(71) Applicant: CERNER INNOVATION, INC., Kansas City, KS (US)

(72) Inventors: Matthew Allen Randall, Kansas City, MO (US); Craig Douglas Hooten, Kansas City, MO (US); Michael Joseph Hemesath, Olathe, KS (US)

(73) Assignee: CERNER INNOVATION, INC., Kansas City, KS (US)

( * ) Notice: Subject to any disclaimer, the term of this patent is extended or adjusted under 35 U.S.C. 154(b) by 185 days.

(21) Appl. No.: 15/333,369

(22) Filed: Oct. 25, 2016

(65) Prior Publication Data

US 2018/0115557 A1 Apr. 26, 2018

(51) Int. Cl.
*H04L 29/06* (2006.01)
*G06F 21/31* (2013.01)
*G06F 21/56* (2013.01)
*H04L 29/08* (2006.01)
*G06F 21/51* (2013.01)

(52) U.S. Cl.
CPC ............ *H04L 63/123* (2013.01); *G06F 21/31* (2013.01); *G06F 21/316* (2013.01); *G06F 21/563* (2013.01); *H04L 63/1441* (2013.01); *H04L 63/1466* (2013.01); *G06F 21/51* (2013.01); *H04L 63/0876* (2013.01); *H04L 67/02* (2013.01)

(58) Field of Classification Search
CPC ............... H04L 63/123; H04L 63/1466; H04L 63/0876; G06F 21/31; G06F 21/563; G06F 21/51
See application file for complete search history.

(56) References Cited

U.S. PATENT DOCUMENTS

| 8,261,087 B2* | 9/2012 | Fort | G06F 21/31 |
| | | | 713/184 |
| 8,914,881 B2* | 12/2014 | Lekies | G06F 21/51 |
| | | | 380/28 |
| 2008/0163128 A1* | 7/2008 | Callanan | G06Q 30/02 |
| | | | 715/856 |
| 2010/0281107 A1* | 11/2010 | Fallows | G06F 9/54 |
| | | | 709/203 |
| 2011/0289556 A1* | 11/2011 | Pieczul | G06F 21/53 |
| | | | 726/3 |

(Continued)

*Primary Examiner* — Nelson Giddins
(74) *Attorney, Agent, or Firm* — Shook, Hardy & Bacon L.L.P.

(57) ABSTRACT

Systems and methods provide for clickjacking prevention code provided in an embedded webpage to prevent clickjacking when the embedded webpage is called by an embedding webpage determined to be illegitimate. When the embedded webpage is loaded on a user device, the clickjacking prevention code is executed and initially prevents content of the embedded webpage from being rendered. Additionally, the clickjacking prevention code sends a message containing a secret to a known domain that provides legitimate embedding webpages. When the embedding webpage sends a message to the embedded webpage, the message is checked to see if it contains the secret. If the message contains the secret, the embedding webpage is legitimate since it originated from the known domain, and the content of the embedded webpage is rendered. Alternatively, if the message does not contain the secret, the content of the webpage is not rendered.

20 Claims, 3 Drawing Sheets

(56) References Cited

U.S. PATENT DOCUMENTS

| | | | | |
|---|---|---|---|---|
| 2011/0321162 A1* | 12/2011 | Gluck | ............... | G06F 11/00 |
| | | | | 726/22 |
| 2011/0321168 A1* | 12/2011 | Amit | ............... | G06F 21/31 |
| | | | | 726/26 |
| 2012/0324552 A1* | 12/2012 | Padala | ............... | G06F 21/10 |
| | | | | 726/6 |
| 2013/0326617 A1* | 12/2013 | Hansen | ............... | G06F 21/50 |
| | | | | 726/22 |
| 2013/0347070 A1* | 12/2013 | Cairns | ............... | H04L 63/126 |
| | | | | 726/3 |
| 2014/0041023 A1* | 2/2014 | Lekies | ............... | G06F 21/51 |
| | | | | 726/22 |
| 2014/0101447 A1* | 4/2014 | Lekies | ............... | H04L 9/0841 |
| | | | | 713/169 |
| 2014/0115701 A1* | 4/2014 | Moshchuk | ............... | G06F 21/51 |
| | | | | 726/23 |
| 2014/0149586 A1* | 5/2014 | Clapp | ............... | H04L 67/02 |
| | | | | 709/224 |
| 2016/0028742 A1* | 1/2016 | Johns | ............... | G06F 16/986 |
| | | | | 726/26 |
| 2016/0028743 A1* | 1/2016 | Johns | ............... | H04L 63/123 |
| | | | | 726/26 |
| 2017/0244714 A1* | 8/2017 | Nam | ............... | H04L 63/08 |
| 2017/0329582 A1* | 11/2017 | Steven | ............... | G06F 8/43 |

* cited by examiner

CLICKJACKING PREVENTION

BACKGROUND

Clickjacking (also known as user interface redressing) is the malicious practice of tricking users to perform unintended actions when attempting to perform other actions on webpages. Clickjacking involves layering a hidden webpage with a webpage presented to the user. The presented webpage may be a legitimate webpage or a spoofed webpage made to look like a legitimate webpage. The hidden webpage could be, for instance, transparent, invisible, concealed, or otherwise rendered in a manner such that the user is unaware of the presence of the hidden webpage. When the user attempts to interact with the presented webpage, the interaction is actually performed on the hidden webpage without the user's knowledge. For instance, when the user attempts to click on a button on the presented webpage, the click actually selects a button on the hidden webpage. Clickjacking could be used for a variety of malicious practices, such as downloading malware to the user's computer, turning on the user's webcam, collecting user information, making a purchase, transferring money, logging into an account, and disseminating spam, to name a few.

SUMMARY

Embodiments of the present invention relate to, among other things, preventing clickjacking on a user device by preventing content from an embedded webpage from being rendered when the embedded webpage is called by an embedding webpage determined to be illegitimate. The embedded webpage includes clickjacking prevention code that is executed when the embedded webpage is loaded on the user device. The clickjacking prevention code initially prevents content of the embedded webpage from being rendered. Additionally, the clickjacking prevention code sends a message containing a secret to a known domain that provides legitimate webpages for calling the embedded webpage. This allows for the determination of whether the embedding webpage originated from the known domain and is therefore legitimate. In particular, the embedding webpage provides a message to the embedded webpage. If the embedding webpage is legitimate and originated from the known domain, the message contains the secret; while if the embedded is illegitimate and originated from a different domain, the message will not contain the secret. Accordingly, if the message from the embedding webpage contains the secret, the content of the embedded webpage is rendered and displayed by the user device. However, if the message from the embedding webpage does not contain the secret, the content of the embedded webpage is not rendered.

Accordingly, in one aspect, an embodiment of the present invention is directed to one or more computer storage media storing computer-useable instructions that, when executed by a computing device, cause the computing device to perform operations. The operations include preventing content of an embedded webpage from being rendered, the embedded webpage having been called by an embedding webpage. The operations also include sending a message containing a secret to a known domain. The operations further include receiving a message from the embedding webpage that called the embedded webpage and determining whether the message from the embedding webpage includes the secret. If the message from the embedding webpage includes the secret, the operations include allowing the content of the embedded webpage to be rendered. If the message from the embedding webpage does not include the secret, the operations include continuing to prevent the content of the embedded webpage from being rendered.

In another embodiment, an aspect is directed to a computer-implemented method for preventing clickjacking on a user device. The method includes receiving an embedded webpage called by an embedding webpage rendered on the user device, the embedded webpage containing clickjacking prevention code; and executing the clickjacking prevention code on the user device to perform operations. The operations include preventing content of an embedded webpage from being rendered, the embedded webpage having been called by an embedding webpage. The operations also include sending a message containing a secret to a known domain. The operations further include receiving a message from the embedding webpage that called the embedded webpage and determining whether the message from the embedding webpage includes the secret. If the message from the embedding webpage includes the secret, the operations include allowing the content of the embedded webpage to be rendered. If the message from the embedding webpage does not include the secret, the operations include continuing to prevent the content of the embedded webpage from being rendered.

A further embodiment is directed to a computer system comprising: one or more processors; and one or more computer storage media storing computer-useable instructions that, when used by the one or more processors, cause the one or more processors to: receive a request for an embedded webpage from a user device, the request having been generated in response to an embedding webpage calling the embedded webpage; and providing the embedded webpage in response to the request, the embedded webpage including clickjacking prevention code that when executed on the client device causes the client device to perform operations that include: preventing content of the embedded webpage from being rendered; sending a message containing a secret to a known domain; receiving a message from the embedding webpage that called the embedded webpage; determining whether the message from the embedding webpage includes the secret; if the message from the embedding webpage includes the secret, allowing the content of the embedded webpage to be rendered; and if the message from the embedding webpage does not include the secret, continuing to prevent the content of the embedded webpage from being rendered.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
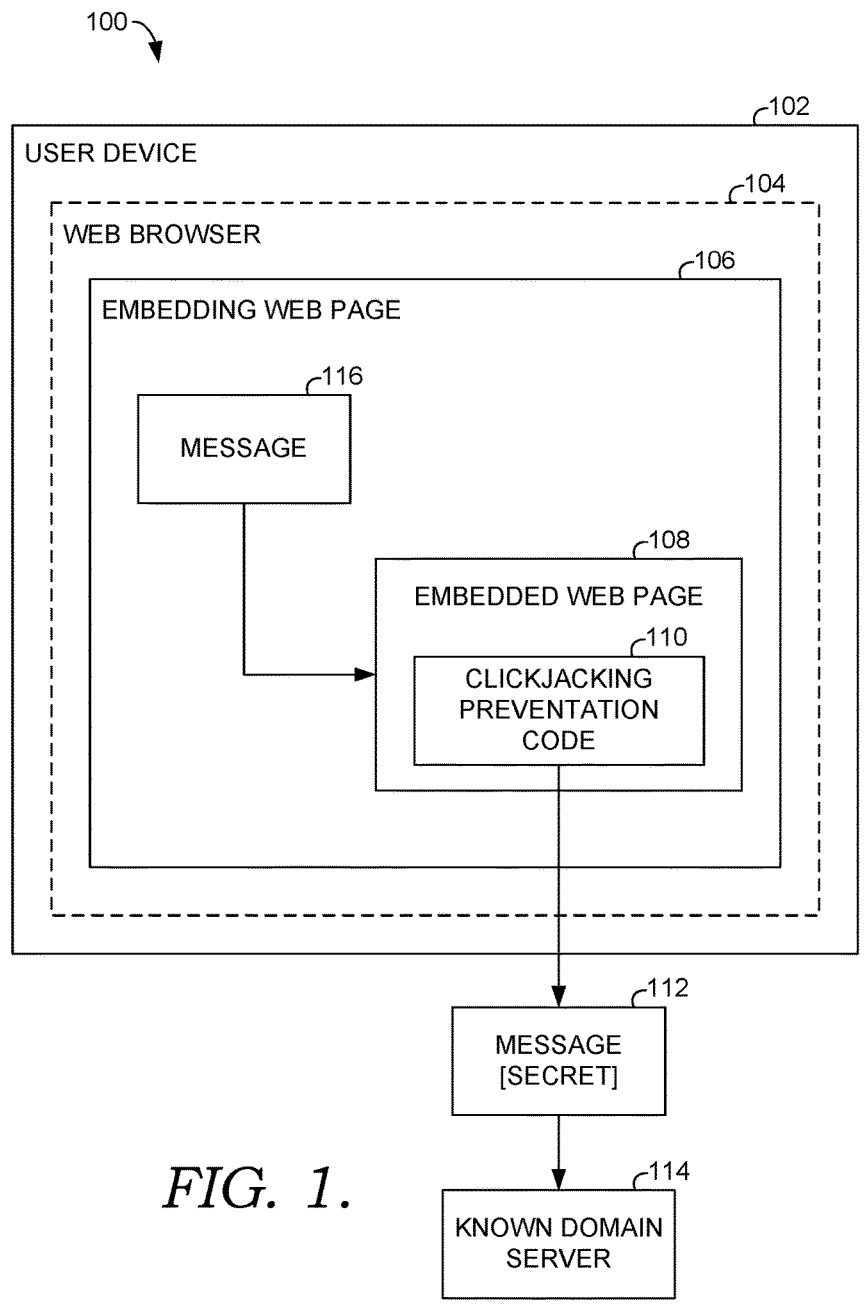
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Although there are many forms of clickjacking, approaches often involve an illegitimate webpage calling a legitimate webpage. In particular, the illegitimate webpage is initially loaded on the user's computer and calls the legitimate webpage to be downloaded and displayed on the user's computer. When the user attempts to interact with the legitimate webpage that is displayed to the user, the user actions are actually performed on the illegitimate webpage, which is hidden (e.g., by making the illegitimate webpage transparent or invisible, or concealing the illegitimate webpage). As used herein, the initially-loaded webpage (i.e., the illegitimate webpage) is referred to as an "embedding webpage," while the webpage (i.e., the legitimate webpage) called by the embedding webpage is referred to as an "embedded webpage." The embedding webpage can call the embedded webpage in any of a variety of different manners. For instance, the embedded webpage can be loaded as a frame of the embedding webpage. Additionally, the embedding webpage and the embedded webpage can be an entire webpage or one or more webpage elements, such as an iframe.

Embodiments of the present invention prevent clickjacking by including clickjacking prevention code (e.g., JavaScript, cascading style sheets—CSS) in an embedded webpage that determines whether an embedding webpage calling the embedded webpage is legitimate or illegitimate. The clickjacking prevention code prevents the content of the embedded webpage from being rendered and displayed if the embedding webpage is determined to be illegitimate but allows the content of the embedded webpage to be rendered and displayed if the embedding webpage is determined to be legitimate.

More particularly, when an embedded webpage is called by an embedding webpage, the clickjacking prevention code initially prevents content of the embedded webpage from being rendered. The clickjacking prevention code sends a secret to a known domain that provides legitimate webpages for calling the embedded webpage. The clickjacking code also requests a response from the embedding webpage, which returns a message to the embedded webpage. If the embedding webpage is legitimate (i.e., originated from the known domain), the embedding webpage returns a message that includes the secret. However, if the embedding webpage is illegitimate (i.e., originated from a domain different from the known domain), the embedding webpage returns a message that does not include the secret. The clickjacking code checks the message from the embedding webpage to determine if it contains the secret. If the message contains the secret, the content of the embedded webpage is rendered. However, if the message does not contain the secret, the content of the embedded webpage is not rendered.

Accordingly, embodiments described herein are able to effectively thwart clickjacking attempts by preventing content of an embedded webpage from rendering unless an embedding webpage is determined to be legitimate. Additionally, the approach is advantageous as it can be implemented using standard coding (e.g., JavaScript, CSS) and works with standard web browsers.

Turning now to FIG. 1, a block diagram is provided illustrating an exemplary system 100 for preventing clickjacking in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 illustrates the situation in which an embedding webpage 106 is initially downloaded from a server to a user device 102. When the embedding webpage 106 is loaded by a web browser 104 on the user device 102, the embedding webpage 106 calls an embedded webpage 108, causing the web browser 104 to download the embedded webpage 108 from a server. The embedded webpage 108 may be called, for instance, as an iframe of the embedding webpage 106. While FIG. 1 illustrates a web browser 104 on the user device 102 loading the embedding webpage 106 and the embedded webpage 108, it should be understood that embodiments could be implemented in the context of other applications that load and render web content.

In accordance with embodiments herein, the embedded webpage 108 includes clickjacking prevention code 110. The clickjacking prevention code 110 could be, for instance, JavaScript, CSS, or other code that can be executed by the web browser 104 to prevent content of the embedded webpage 108 from being rendered and displayed by the web browser 104 if clickjacking is suspected.

When the web browser 104 loads the embedded webpage 108, the clickjacking prevention code 110 is executed. The clickjacking prevention code 110 initially prevents the content of the embedded webpage 108 from being rendered. For instance, the clickjacking prevention code 110 could implement known framekiller techniques that prevent the content of the embedded webpage 108 from being rendered and displayed as a frame of the embedding webpage 106. Other known techniques could be employed to prevent the content of the embedded webpage 108 from being rendered. In one configuration, the clickjacking prevention code 110 comprises CSS that initially sets the "display" attribute of the top-level element of the embedded webpage 108 to "none", thus preventing rendering.

The clickjacking prevention code 110 also causes a message 112 containing a secret to be sent to a server 114 for a known domain. The known domain is a legitimate domain that is expected to provide a legitimate embedding webpage that calls the embedded webpage 108. For instance, the postMessage API can be used. In particular, the "targetOrigin" parameter can be used to specify the domain to deliver the secret, which is preferably not guessable (high entropy), such as a UUID.

While FIG. 1 illustrates an embodiment with a message being sent to only one domain, in some instances, an embedded webpage could be called by a legitimate embedding webpage from any one of a number of known domains. In such instances, the clickjacking prevention code 110 causes a message to be sent to a server for each of the known domains.

If the embedding webpage 106 is a legitimate webpage that originated from the known domain, the secret is passed to the embedding webpage 106. However, if the embedding webpage 106 did not originate from the known domain, the secret is not passed to the embedding webpage 106.

After the secret has been provided to the known domain, the embedding webpage 106 sends a message 116 to the embedded webpage 108. In some configurations, the delivery of the secret to the known domain can trigger the embedding webpage 106 to respond. Alternatively, a separate message (e.g., a postMessage) from the embedded webpage 108 could be used to signal the embedding webpage 106 to respond (e.g., using postMessage).

When the embedded webpage 108 receives the message 116, the content of the message 116 is examined to determine if it contains the secret sent to the known domain. As noted above, if the embedding webpage 106 originated from the known domain, it will receive the secret, and as such, can return the secret with the message 116. Accordingly, if the message 116 contains the secret, the embedding webpage 108 is considered to be legitimate since it originated from the known domain, and the clickjacking prevention code 110 allows the content of the embedded webpage 108 to be rendered and displayed by the web browser 104. As noted above, in one configuration, the clickjacking prevention code 110 comprises CSS that initially sets the "display" attribute of the top-level element of the embedded webpage 108 to "none", thus preventing rendering. Once a secret is received and verified, the clickjacking prevention code 110 can remove the CSS attribute of "display: none", in turn causing the embedded page 108 to render.

Alternatively, if the message 116 does not contain the secret, the embedding webpage 106 is not considered to be legitimate, and the clickjacking prevention code 110 continues to prevent the content of the embedded webpage 108 from being rendered and displayed by the web browser 104.

Figure 2:
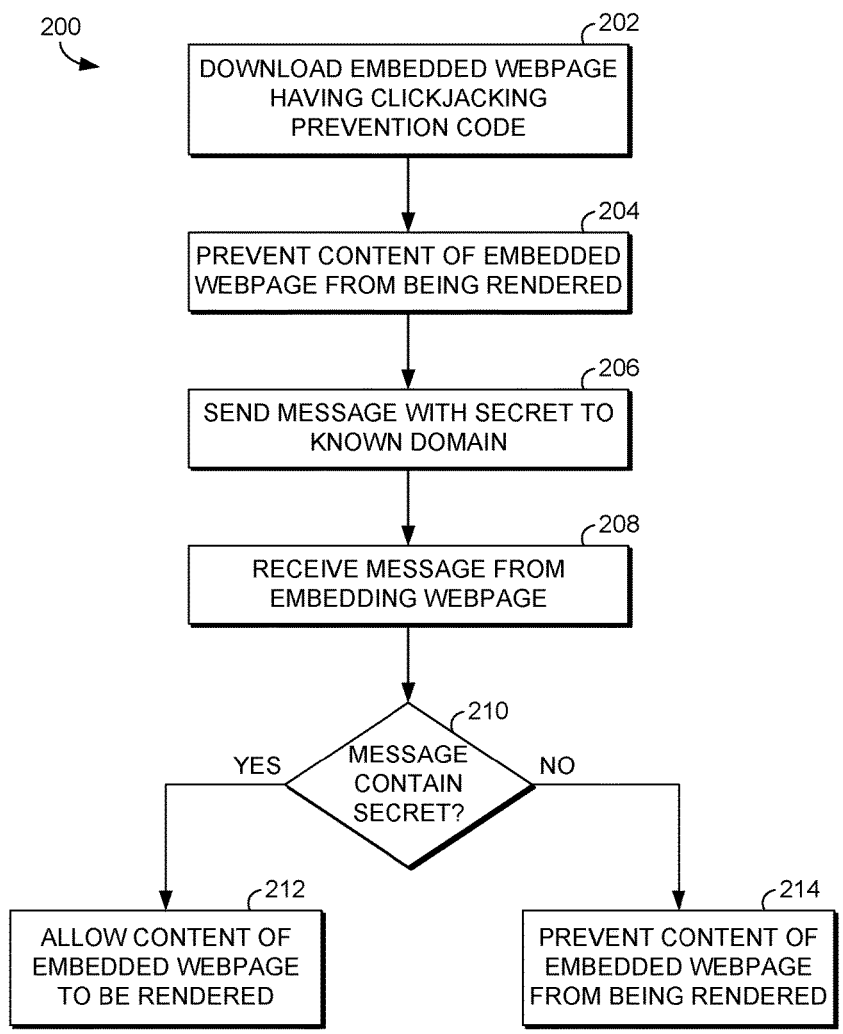
FIG. 2 is a flow diagram showing a method for preventing clickjacking by sending a secret to a known domain and requiring an embedding webpage to provide the secret in order for content to be rendered for an embedded webpage in accordance with some implementations of the present disclosure.

With reference now to FIG. 2, a flow diagram is provided illustrating a method 200 for preventing clickjacking by sending a secret to a known domain and requiring an embedding webpage to provide the secret in order for content to be rendered for an embedded webpage. Each block of the method 200 and any other method described herein comprises a computing process performed using any combination of hardware, firmware, and/or software. For instance, various functions can be carried out by a processor executing instructions stored in memory. The methods can also be embodied as computer-usable instructions stored on computer storage media.

As shown at block 202, an embedded webpage is downloaded from a server to a user device in response to an embedding webpage being rendered on the user device and calling the embedded webpage. The embedded webpage includes clickjacking prevention code that performs operations to prevent clickjacking as described herein. The clickjacking prevention code is executed when the embedded webpage is loaded by a web browser or other application on the user device.

The clickjacking prevention code initially prevents content of the embedded webpage from being rendered on the user device, as shown at block 304. This may be done, for instance, using known framekiller techniques that block the content of the embedded webpage from being rendered.

As shown at block 206, a message is sent by the clickjacking prevention code to a known domain. The known domain is a domain that provides a legitimate webpage for calling the embedded webpage. The message contains a secret for verifying whether the embedding webpage originated from the known domain and is therefore legitimate.

A message from the embedding webpage is received by the embedded webpage, as shown at block 208. The message may be communicated from the embedding webpage to the embedded webpage, for instance, using a PostMessage. When the message from the embedding webpage is received, the clickjacking prevention code determines whether the message includes the secret that was sent to the known domain, as shown at block 210. If it is determined that the message contains the secret, the clickjacking prevention code allows the content of the embedded webpage to be rendered, as shown at block 212. Alternatively, if it is determined that the message does not contain the secret, the clickjacking prevention code continues to prevent the content of the embedded webpage from being rendered, as shown at block 214.

Figure 3:
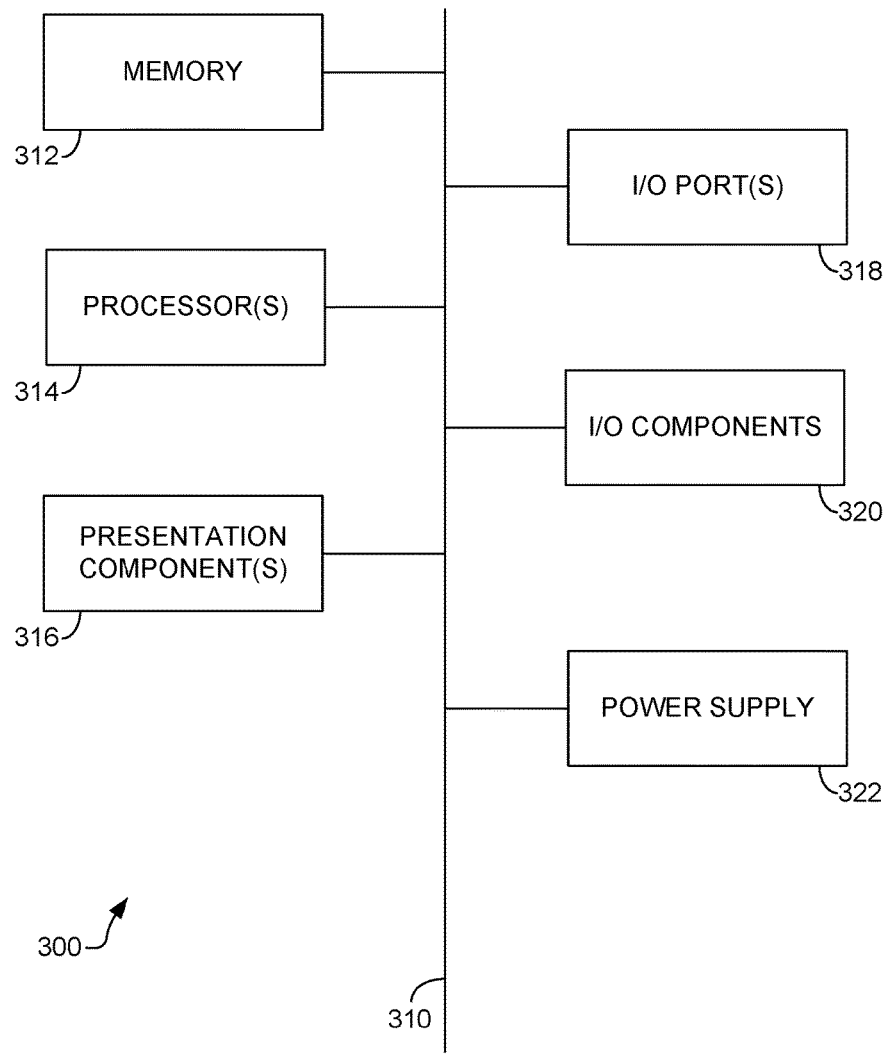
FIG. 3 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 3 in particular, an exemplary operating environment for implementing embodiments of the present invention is shown and designated generally as computing device 300. Computing device 300 is but one example of a suitable computing environment and is not intended to suggest any limitation as to the scope of use or functionality of the invention. Neither should the computing device 300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 3, computing device 300 includes bus 310 that directly or indirectly couples the following devices: memory 312, one or more processors 314, one or more presentation components 316, input/output (I/O) ports 318, input/output components 320, and illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 3 and reference to "computing device."

Computing device 300 typically includes a variety of computer-readable media. Computer-readable media can be any available media that can be accessed by computing device 300 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 312 includes computer storage media in the form of volatile and/or nonvolatile memory. The memory may be removable, non-removable, or a combination thereof. Exemplary hardware devices include solid-state memory, hard drives, optical-disc drives, etc. Computing device 300 includes one or more processors that read data from various entities such as memory 312 or I/O components 320. Presentation component(s) 316 present data indications to a user or other device. Exemplary presentation components include a display device, speaker, printing component, vibrating component, etc.

I/O ports 318 allow computing device 300 to be logically coupled to other devices including I/O components 320, some of which may be built in. Illustrative components include a microphone, joystick, game pad, satellite dish, scanner, printer, wireless device, etc. The I/O components 320 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 300. The computing device 300 may be equipped with depth cameras, such as, stereoscopic camera systems, infrared camera systems, RGB camera systems, and combinations of these for gesture detection and recognition. Additionally, the computing device 300 may be equipped with accelerometers or gyroscopes that enable detection of motion.

As described above, implementations of the present disclosure relate to preventing clickjacking. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when executed by a computing device, cause the computing device to perform operations, the operations comprising:
   preventing content of an embedded webpage from being rendered on a user device, the embedded webpage having been called by an embedding webpage;
   sending a message containing a secret from the embedding webpage on the user device to a server of a known domain;
   after sending the message containing the secret to the server, receiving a message from the embedding webpage that called the embedded webpage;
   determining, on the user device, whether the message from the embedding webpage includes the secret, the message from the embedding webpage including the secret when the embedding webpage is legitimate and receives the secret from the server after the secret is sent to the server from the user device;
   when the message from the embedding webpage includes the secret, allowing the content of the embedded webpage to be rendered; and
   when the message from the embedding webpage does not include the secret, continuing to prevent the content of the embedded webpage from being rendered.

2. The one or more computer storage media of claim 1, wherein the content of the embedded webpage is prevented from being rendered using a framekiller technique.

3. The one or more computer storage media of claim 1, wherein the message to the known domain is a PostMessage.

4. The one or more computer storage media of claim 1, wherein the message from the embedding webpage is a PostMessage.

5. The one or more computer storage media of claim 1, wherein the embedding webpage calls the embedded webpage to be displayed within an iframe.

6. The one or more computer storage media of claim 1, wherein the operations are performed by a web browser on the user device.

7. The one or more computer storage media of claim 1, wherein the operations further comprise sending a message containing the secret to at least one other known domain.

8. A computer-implemented method for preventing clickjacking on a user device, the method comprising:

receiving an embedded webpage called by an embedding webpage rendered on the user device, the embedded webpage containing clickjacking prevention code; and executing the clickjacking prevention code on the user device to perform operations that include:

preventing content of the embedded webpage from being rendered;

sending a message containing a secret to a server of a known domain;

after sending the message containing the secret to the server, receiving a message from the embedding webpage that called the embedded webpage;

determining whether the message from the embedding webpage includes the secret, the message from the embedding webpage including the secret when the embedding webpage is legitimate and receives the secret from the server after the secret is sent to the server from the user device;

when the message from the embedding webpage includes the secret, allowing the content of the embedded webpage to be rendered; and when the message from the embedding webpage does not include the secret, continuing to prevent the content of the embedded webpage from being rendered.

9. The method of claim 8, wherein the content of the embedded webpage is prevented from being rendered using a framekiller technique.

10. The method of claim 8, wherein the message to the known domain is a PostMessage.

11. The method of claim 8, wherein the message from the embedding webpage is a PostMessage.

12. The method of claim 8, wherein the embedding webpage calls the embedded webpage to be displayed within an iframe.

13. The method of claim 8, wherein the method is performed by a web browser on the user device.

14. The method of claim 8, wherein the method further comprises sending a message containing the secret to at least one other known domain.

15. A computer system comprising:
one or more hardware processors; and
one or more computer storage media storing computer-useable instructions that, when used by the one or more processors, cause the one or more processors to:

receive a request for an embedded webpage from a user device, the request having been generated in response to an embedding webpage calling the embedded webpage; and providing the embedded webpage in response to the request, the embedded webpage including clickjacking prevention code that when executed on the client device causes the client device to perform operations that include:

preventing content of the embedded webpage from being rendered;

sending a message containing a secret to a server of a known domain;

after sending the message containing the secret to the server, receiving a message from the embedding webpage that called the embedded webpage;

determining whether the message from the embedding webpage includes the secret, the message from the embedding webpage including the secret when the embedding webpage is legitimate and receives the secret from the server after the secret is sent to the server from the user device;

when the message from the embedding webpage includes the secret, allowing the content of the embedded webpage to be rendered; and when the message from the embedding webpage does not include the secret, continuing to prevent the content of the embedded webpage from being rendered.

16. The system of claim 15, wherein the content of the embedded webpage is prevented from being rendered using a framekiller technique.

17. The system of claim 15, wherein the message to the known domain is a PostMessage.

18. The system of claim 15, wherein the message from the embedding webpage is a PostMessage.

19. The system of claim 15, wherein the embedding webpage calls the embedded webpage to be displayed within an iframe.

20. The system of claim 15, wherein the operations further comprise sending a message containing the secret to at least one other known domain.

* * * * *